United States Patent
Lieber et al.

(10) Patent No.: US 10,920,036 B2
(45) Date of Patent: Feb. 16, 2021

(54) VULCANIZABLE COMPOSITIONS BASED ON HYDROGENATED NITRILE RUBBER, METHOD FOR PRODUCING SAME, AND USE THEREOF

(71) Applicant: ARLANXEO DEUTSCHLAND GMBH, Dormagen (DE)

(72) Inventors: Susanna Lieber, Kaiserslautern (DE); Ulrich Frenzel, Dormagen (DE); Karola Schneiders, Bergisch Gladbach (DE)

(73) Assignee: ARLANXEO DEUTSCHLAND GMBH, Dormagen (DE)

(*) Notice: Subject to any disclaimer, the term of this patent is extended or adjusted under 35 U.S.C. 154(b) by 162 days.

(21) Appl. No.: 16/072,432

(22) PCT Filed: Jan. 20, 2017

(86) PCT No.: PCT/EP2017/051238
§ 371 (c)(1),
(2) Date: Jul. 24, 2018

(87) PCT Pub. No.: WO2017/129494
PCT Pub. Date: Aug. 3, 2017

(65) Prior Publication Data
US 2019/0031856 A1    Jan. 31, 2019

(30) Foreign Application Priority Data

Jan. 25, 2016 (EP) .................. 16152584

(51) Int. Cl.
*C08K 3/34* (2006.01)
*C08L 9/02* (2006.01)
*C08K 5/14* (2006.01)
(52) U.S. Cl.
CPC ............. *C08K 3/346* (2013.01); *C08K 3/34* (2013.01); *C08K 5/14* (2013.01); *C08K 2201/014* (2013.01)

(58) Field of Classification Search
CPC .......... C08K 3/346; C08L 9/02; C08L 15/005
See application file for complete search history.

(56) References Cited

U.S. PATENT DOCUMENTS

| | | | |
|---|---|---|---|
| 5,013,783 A | 5/1991 | Thoermer et al. | |
| 7,256,233 B2* | 8/2007 | Simonot | B60C 1/00 152/209.1 |
| 8,436,098 B2* | 5/2013 | Dittrich | C08L 21/00 525/209 |
| 2006/0106171 A1* | 5/2006 | Resendes | C08K 5/14 525/192 |
| 2013/0029069 A1 | 1/2013 | Soddemann et al. | |
| 2014/0203520 A1* | 7/2014 | Yamanaka | F04D 29/106 277/549 |

FOREIGN PATENT DOCUMENTS

| | | |
|---|---|---|
| EP | 1277796 A1 | 1/2003 |
| JP | H0337243 A | 2/1991 |
| JP | 2001310975 A | 11/2001 |
| JP | 200783732 A | 4/2007 |
| JP | 2013503226 A | 1/2013 |
| JP | 2015105278 A | 6/2015 |
| WO | 2013035697 A1 | 3/2013 |

* cited by examiner

*Primary Examiner* — Vickey Nerangis
(74) *Attorney, Agent, or Firm* — Norris McLaughlin PA

(57) ABSTRACT

The present invention relates to vulcanizable compositions on the basis of hydrogenated nitrile rubber, a mineral filer with specific surface area ($N_2$ surface area) smaller than 10 $m^2/g$ comprising at least 40% by weight silicate ($SiO_2$) and at least 10% by weight aluminium oxide ($Al_2O_3$), a sodium silicate and a crosslinking system on the basis of free-radical donors. The invention further relates to the production of these vulcanizable compositions, and also to vulcanized products which are produced therefrom and their use in particular in gaskets, belts, roll coverings, hoses and cables.

19 Claims, No Drawings

VULCANIZABLE COMPOSITIONS BASED ON HYDROGENATED NITRILE RUBBER, METHOD FOR PRODUCING SAME, AND USE THEREOF

The present invention relates to vulcanizable compositions comprising hydrogenated nitrile rubber, mineral filler with specific surface area ($N_2$ surface area) smaller than 10 $m^2/g$ comprising at least 40% by weight silicate ($SiO_2$) and at least 10% by weight aluminium oxide ($Al_2O_3$), basic sodium silicate and a crosslinking system based on free-radical donors. The invention further relates to the production of these vulcanizable compositions, and also to vulcanizates produced therefrom and use of these in particular in gaskets, belts, roll coverings, hoses and cables.

There is a requirement for hydrogenated nitrile rubbers in gaskets which exhibit high resistance to high and low temperature and simultaneously high oil resistance. There is a particular requirement for ageing-resistant nitrile rubbers, in particular hydrogenated nitrile rubbers which comply with many of the requirements of the standard EN 549 and have not only a low swelling factor but also a low high-temperature compression set value and strong high-temperature ageing resistance at 175° C., in particular hardness stability and elongation-at-break stability.

The properties of a vulcanizate depend on the interaction of the constituents of the vulcanizable composition. Decisive factors are not only the hydrogenated nitrile rubber as main constituent but also especially the fillers also used. There are many known mineral and synthetic fillers with reinforcing and non-reinforcing properties.

The person skied in the art understands the term "reinforcement" to mean the entirety of all rubber-filler interactions which become apparent in physical properties not only in the uncross linked state but also in the cross linked state.

Reinforcing (active) fillers alter viscoelastic properties through interaction with the rubber matrix. They increase the viscosity of the rubbers and improve the fracture behaviour of the vulcanizates, for example elongation at break, tear resistance and abrasion.

Examples of reinforcing filers are specific carbon blacks, precipitated silicas with high specific surface area and fumed silicas with high specific surface area. However, the filler used most frequently is carbon black.

Non-reinforcing (inert) fillers dilute the rubber matrix. This has the effect of impairing certain properties, e.g. fracture energy (i.e. the integral of the stress-strain curve); there can be a favourable effect on other properties such as processability or gas-impermeability (see F. Röthemeyer, F. Sommer "Kautschuktechnologie: Werkstoffe—Verarbeitung—Produkte" (Rubber technology: materials—processing—products" 2013, 3rd Edition, pp. 261-262). It is known from the literature that non-reinforcing fliers can improve compression set.

Fillers in the form of 5% by weight solution in water have a characteristic pH. This pH can be used to draw a distinction between acidic and basic fillers.

EP-A-0 795 580 discloses on page 8 and 9 in table 1 and 2 rubber compositions (examples 1 to 7 an comparative examples 2 and 3) comprising hydrogenated nitrile rubber (HNBR), a mineral filler (calcium carbonate), a further mineral filer (Carplex 1120; wet process silica), a metal oxide (ZnO), where the metal derives from the 2nd group of the periodic table of the elements, and aperoxide compound (Peroxymaon F-40). In the Examples in Table 1 there is no disclosure of compositions made of HNBR, a basic sodium silicate, a mineral filler with specific surface area ($N_2$ surface area) smaller than 10 $m^2/g$ comprising at least 40% by weight silicate ($SiO_2$) and at least 10% by weight aluminum oxide ($Al_2O_3$) and a peroxide compound.

DE102008060258 discloses on page 7, paragraph [0057] a rubber composition (example I) comprising hydrogenated nitrile rubber (HNBR), a mineral filler (Kieselgur Celite 281) with specific surface area of 1.5 $m^2/g$ comprising 90.0% by weight $SiO_2$ and 4.0% by weight $Al_2O_3$, an active filler (Vulcasil) and a peroxide compound (Perkadox 14/40). The mineral filler comprises less than 10% by weight $Al_2O_3$. A definition of "Vulcasil" is not disclosed.

WO-A-2004/035669 comprises on page 24 the examples 21 and 22 comprising hydrogenated nitrile rubber (HNBR), a mineral filler (Satintone SP-33 Kaolin Clay), a silicate ($SiO_2$) with a pH of 7 (Hi-SIL 233) and a peroxide compound (Vulcup 40KE). A composition with a basic sodium silicate is not disclosed.

The use of basic sodium silicates is in principle known. Basic silicates have pH above 7 in water (5% by weight in water) measured in accordance with DIN ISO 787/9. Examples of basic sodium silicates are sodium aluminium silicate (for example Vulkasil® A1, Zeolex® 23, HM500).

WO2011/023771 discloses on page 48 and 51 the examples 14 to 16 comprising hydrogenated nitrile rubber (HNBR) a mineral filler (Celite, specific surface area of 1.5 $m^2/g$; 90.0% by weight $SiO_2$ and 4.0% by weight $Al_2O_3$), a silicate (Vulkasil A1 (basic sodium silicate); Coupsil VP 6508 (surface modified precipitated silica with organosilane coating); Vulkasil N) and a peroxide compound (1,3-bis-(tert-butylperoxy-isopropyl)-benzol, Perkadox 14-40; Perkadox 14s).

EP-A-O 778 327 discloses the use of butadiene-acrylonitrile-acrylate copolymers, organic peroxide as crosslinking agent, metal oxides as vulcanization aids and basic sodium silicates as reinforcing filers in vulcanizable compositions. However, the document does not disclose a vulcanizable composition comprising hydrogenated nitrile rubber, basic sodium silicate, a peroxide compound and mineral filler with specific surface area (N surface area) smaller than 10 $m^2/g$ comprising at least 40% by weight silicate ($SiO_2$) and at least 10% by weight aluminium oxide ($Al_2O_3$).

WO-A-2010030860 discloses on page 14 example 1 and on page 18 comparative example 2 comprising hydrogenated nitrile rubber (HNBR), mineral filer (MgO, Maglit; ZnO, Kadox), basic sodium silicate (Zeolex 23) and a peroxide compound (Vulcup 40KE). A composition comprising a mineral flier with specific surface area ($N_2$ surface area) smaller than 10 $m^2/g$ comprising at least 40% by weight silicate ($SiO_2$) and at least 10% by weight aluminium oxide ($Al_2O_3$) is not disclosed.

None of the documents of the prior art discloses vulcanizable compositions of hydrogenated nitrile rubbers with a combination of mineral filler with specific surface area ($N_2$ surface area) smaller than 10 $m^2/g$ comprising at least 40% by weight silicate ($SiO_2$) and at least 10% by weight aluminium oxide ($Al_2O_3$) and basic sodium silicate.

The vulcanizates disclosed in the prior art do not provide satisfactory values in respect of high-temperature compression set and of ageing resistance, in particular in respect of hardness stability and elongation-at-break stability.

It was the object of the present invention to provide vulcanizable compositions and their vulcanizates based on hydrogenated nitrile rubbers, where the vulcanizates have
1. a high-temperature compression set value (CS) of less than 45%, preferably less than 40%, after storage at 175° C. for 168 hours, 2. a change of hardness (ΔH) of 10% or less, preferably 8% or less, after storage at 175° C. for 188 hours, and
3. a change of elongation at break (ΔEB) of less than 35%, preferably less than 30%, after storage at 175° C. for 168 hours.

Surprisingly, it has now been found that the combination of a mineral filler with specific surface area ($N_2$ surface area) smaller than 10 $m^2/g$ comprising at least 40% by weight silicate ($SiO_2$) and at least 10% by weight aluminium oxide ($Al_2O_3$) based on the total amount of the mineral filler, for example Polestar® 200R, and a basic sodium silicate, for example Vulcasil® A1, with a hydrogenated nitrile rubber leads, after peroxide crosslinking, to vulcanizates which comply with the required properties and thus have not only a low high-temperature compression set value but also excellent ageing resistance.

The invention therefore provides vulcanizable compositions comprising
(a) at least one hydrogenated nitrile rubber,
(b) at least one mineral filer with specific surface area ($N_2$ surface area) smaller than 10 $m^2/g$ comprising at least 40% by weight silicate ($SiO_2$) and at least 10% by weight aluminium oxide ($Al_2O_3$) based on the total amount of component (b),
(c) at least one basic sodium silicate and
(d) at least one peroxide compound.

This property profile cannot be achieved with use of the vulcanizable compositions known hitherto which involve hydrogenated nitrile rubbers but which doe not comprise any combination of the two components (b) and (c), but instead comprise only each of components (b) and (c) alone.

Preferred vulcanizable compositions are those comprising
(a) 100 parts by weight of at least one hydrogenated nitrile rubber,
(b) from 50 to 100 parts by weight, preferably from 60 to 90 parts by weight of at least one mineral filler with specific surface area ($N_2$ surface area) smaller than 10 $m^2/g$ comprising at least 40% by weight silicate ($SiO_3$) and at least 10% by weight aluminium oxide ($Al_2O_3$) based on the total amount of component (b),
(c) from 5 to 50 parts by weight, preferably from 10 to 30 parts by weight, of at least one basic sodium silicate with pH in water (5% by weight in water) measured in accordance with DIN ISO 787/9 greater than 7 and
(d) from 1 to 20 parts by weight, preferably from 2 to 10 parts by weight, of at least one peroxide compound.

Particular preference is given to vulcanizable compositions comprising
(a) 100 parts by weight of at least one hydrogenated nitrile rubber,
(b) from 50 to 100 parts by weight, preferably from 60 to 90 parts by weight, of calcined kaolin comprising 50 to 60% by weight, preferably 55% by weight of $SiO_2$ and 35 to 45% by weight, preferably 41% by weight of $Al_2O_3$ based on the total amount of component (b) with pH in water (5% by weight in water) measured in accordance with DIN ISO 787/9 of 6.5±0.5 and with (BET) surface area measured in accordance with ISO 9277 of 8.5 $m^2/g$.
(c) from 5 to 50 parts by weight, preferably from 10 to 30 parts by weight, of sodium aluminium silicate with pH in water (5% by weight in water) measured in accordance with DIN ISO 787/9 of 11.3±0.7, with content of volatile constituents measured in accordance with DIN ISO 787/2 of 5.5±1.5 and with (BET) surface area measured in accordance with ISO 9277 of 65±15.
(d) from 1 to 20 parts by weight, preferably from 2 to 10 parts by weight, of at least one peroxide compound, preferably dicumyl peroxide, tort-butyl cumyl peroxide, bis(tert-butylperoxyisopropyl)benzene, di-tert-butyl peroxide, 2,5-dimethylhexane 2,5-dihydroperoxide, 2,5-dimethylhex-3-yne 2,5-dihydroperoxide or dibenzoyl peroxide.

Another feature of the vulcanizable compositions of the invention is that the vulcanizates produced therefrom have
a high-temperature compression set value below 45% measured in accordance with DIN ISO 850 Part A after storage at 175° C. for 168 hours,
a change of hardness of 10% or less measured in accordance with DIN 53508 after storage at 175° C. for 168 hours and
a change of elongation at break of less than 35% measured in accordance with DIN 53508 after storage at 175° C. for 168 hours.

The vulcanizable composition of the invention comprises at least one hydrogenated nitrile rubber as component (a).

Hydrogenated Nitrile Rubbers:

For the purposes of this application hydrogenated nitrile rubbers (HNBR) are co- and/or terpolymers based on at least one conjugated diene and on at least one α,β-unsaturated nitrile monomer, and also optionally on other copolymerizable monomers, where the copolymerized diene units are entirely or to some extent hydrogenated.

For the purposes of this application, "hydrogenation" or "hydrogenated" means at least 50%, preferably at least 85%, particularly preferably at least 95%, reaction of the double bonds originally present in the nitrile rubber.

Any known α,β-unsaturated nitrile can be used as α,β-unsaturated nitrile, preference being given to ($C_3$-$C_5$)-α,β-unsaturated nitriles such as acrylonitrile, methacrylonitrile, ethacrylonitrile or a mixture thereof. Particular preference is given to acrylonitrile.

The conjugated diene can be of any type. Preference is given to use of ($C_4$-$C_6$) conjugated dienes. Particular preference is given to 1,3-butadiene, isoprene, 2,3-dimethylbutadiene, piperylene or a mixture thereof. Preference is in particular given to 1,3-butadiene and isoprene or a mixture thereof. Very particular preference is given to 1,3-butadiene.

The proportions of conjugated diene and of α,β-unsaturated nitrile in the hydrogenated nitrile rubbers can vary widely. The proportion of the, or of the entirety of the, conjugated dienes is usually in the range from 40 to 90% by weight and preferably in the range from 50 to 80% by weight, based on the entire polymer. The proportion of the, or of the entirety of the, α,β-unsaturated nitriles is usually in the range from 10 to 60% by weight and preferably in the range from 20 to 50% by weight, based on the entire polymer. Quantities that can be used for the additional monomers are in the range from 0.1 to 40% by weight, preferably in the range from 1 to 30% by weight, based on the entire polymer. In this case corresponding proportions of the conjugated diene(s) and/or of the α,β-unsaturated nitrile(s) are replaced by the proportions of the additional monomers, where the proportions of all of the monomers in each case give a total of 100% by weight.

The production of these hydrogenated nitrile rubbers suitable for the vulcanizable compositions of the invention is sufficiently familiar to the person skilled in the art.

The literature (e.g. Houben-Weyl, Methoden der Organischen Chemie [Methods of Organic Chemistry] Vol. 14/1, Georg Thieme Verlag Stuttgart 1961) provides an exhaustive description of the initial production of the nitrile rubbers by polymerization of the abovementioned monomers.

The subsequent hydrogenation of the nitrile rubbers described above to given hydrogenated nitrile rubber can take place in the manner known to the person skilled in the art.

It is possible in principle to carry out the hydrogenation of nitrile rubbers with use of homogeneous or heterogeneous hydrogenation catalysts.

As described in WO-A-01/77185, it is possible by way of example to carry out the reaction with hydrogen with use of homogeneous catalysts, for example the catalyst known as Wilkinson's" catalyst ((PPh$_3$)$_3$RhCl), or with other catalysts. Processes for the hydrogenation of nitrile rubber are known. It is usual to use rhodium or titanium as catalysts, but it also possible to use platinum, iridium, palladium, rhenium, ruthenium, osmium, cobalt or copper either in the form of metal or else preferably in the form of metal compounds (see, for example, U.S. Pat. No. 3,700,637, DE-A-25 39 132, EP-A-134 023, DE-OS-35 41 889, DE-OS-35 40 918, EP-A-298 386, DE-OS-35 29 252, DE-OS-34 33 392. U.S. Pat. Nos. 4,464,515 and 4,503,196).

Suitable catalysts and solvents for homogeneous-phase hydrogenation are described below and are also known from DE-A-25 39 132 and EP-A-0 471 250.

The selective hydrogenation can by way of example be achieved in the presence of a rhodium-containing catalyst. It is possible, for example, to use a catalyst of the general formula

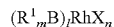

$$(R^1{}_mB)_l RhX_n$$

in which

R$^t$ are identical or different and are a C$_1$-C$_8$ alkyl group, a C$_4$-C$_8$ cycloalkyl group, a C$_8$-C$_{15}$ Aryl group or a C$_7$-C$_{15}$ aralkyl group.

B is phosphorus, arsenic, sulphur or a sulphoxide group S=O,

X is hydrogen or an anion, preferably halogen and particularly preferably chlorine or bromine, l is 2, 3 or 4, m is 2 or 3 and n is 1, 2 or 3, preferably 1 or 3.

Preferred catalysts are tris(triphenylphosphine)rhodium (I)chloride, tris(triphenyl-phosphine)rhodium(II)chloride and tris(dimethyl sulphoxide)rhodium(III)chloride and tetrakis-(triphenylphosphin)rhodium hydride of the formula ((C$_6$H$_5$)$_3$P)$_4$RhH and the corresponding compounds in which the triphenylphosphine has been replaced entirely or to some extent by tricyclohexylphosphine. Small quantities of the catalyst can be used. A suitable quantity are in the range from 0.01 to 1% by weight, preferably in the range from 0.03 to 0.5% by weight and particularly preferably in the range from 0.1 to 0.3% by weight, based on the weight of the polymer.

It is usually advisable to use the catalyst together with a co-catalyst which is a ligand of the formula R$^1{}_m$B, where R$^1$, m and B have the meanings specified above for the catalyst. It is preferable that m is 3, B being phosphorus, and the moieties R$^1$ can be identical or different. It is preferable that co-catalysts here have trialkyl, tricycloalkyl, triaryl, triaralkyl, diarylmonoalkyl, diarylmonocycloalkyl, diakylmonoaryl, dialkyl-monocycloalkyl, dicycloalkylmonoaryl or dicyclalkylmonoaryl moieties.

Examples of co-catalysts are found by way of example in U.S. Pat. No. 4,631,315. Preferred co-catalyst is triphenylphosphine. Quantities used of the co-catalyst are preferably in the range from 0.3 to 5% by weight, particularly preferably in the range from 0.5 to 4% by weight, based on the weight of the nitrile rubber to be hydrogenated. The ratio by weight of the rhodium-containing catalyst to the co-catalyst is moreover preferably in the range from 1:3 to 1:55, particularly preferably in the range from 1:5 to 1:45. The quantity used of the co-catalyst, based on 100 parts by weight of the nitrile rubber to be hydrogenated, is suitably from 0.1 to 33 parts by weight, preferably from 0.5 to 20 parts by weight and very particularly preferably from 1 to 5 parts by weight, in particular more than 2 parts by weight but less than 5 parts by weight, based on 100 parts by weight of the nitrile rubber to be hydrogenated.

The practical conduct of these hydrogenations is known to the person skilled in the art, for example from U.S. Pat. No. 6,683,136. In the usual method, hydrogen is used to treat the nitrite rubber to be hydrogenated in a solvent such as toluene or monochlorobenzene at a temperature in the range from 100° C. to 150° C. and at a pressure in the range from 50 bar to 150 bar for from 2 hours to 10 hours.

When heterogeneous catalysts are used for the production of hydrogenated carboxylated nitrile rubbers by hydrogenation of the corresponding carboxylated nitrile rubbers, supported catalysts based on paladium are usually used.

The Mooney viscosity (ML 1+4 measured at 100° C.) of the hydrogenated nitrile rubber (a) used or, insofar as a plurality of hydrogenated nitrile rubbers (a) are used, of the entire mixture of all the hydrogenated nitrile rubbers (a) is in the range from 10 to 120, preferably in the range from 15 to 100. The Mooney viscosity is determined here in accordance with ASTM standard D1646.

The hydrogenated nitrite rubber of the invention has 10% or less content of residual double bonds (RDB), preferably 7% or less, particularly preferably 1% or less.

The glass transition temperature of the hydrogenated nitrile rubbers that can be used in the vulcanizable composition of the invention is below −15° C. preferably below −20° C., particularly preferably below −25° C.

Hydrogenated nitrile rubbers (a) of this type are to some extent obtainable commercially, but in all cases are also accessible by production processes that can be found in the literature by the person skilled in the art. Examples of hydrogenated nitrile rubbers are fully and partially hydrogenated nitrile rubbers with acrylonitrile contents n the range from 20 to 50% by weight (Therban® range from LANXESS Deutschland GmbH and the Zetpol® range from Nippon Zeon Corporation). Examples of hydrogenated butadiene/acrylonitrile/acrylate polymers is the Therban® LT range from LANXESS Deutschland GmbH, for example Therban® LT 2157 and Therban® LT 2007. An example of carboxylated hydrogenated nitrile rubbers is the Therban® XT range from LANXESS Deutschland GmbH. Examples of hydrogenated nitrile rubbers with low Mooney viscosities and therefore improved processability is a product from the Therban® AT range, for example Therban® AT 3404.

The hydrogenated nitrite rubber can comprise, alongside repeating units of at least one unsaturated nitrile and of at least one conjugated dine, one or more other copolymerizable monomers in the form of carboxylic acids or carboxylic esters. These are then hydrogenated carboxylated nitrile rubbers (also abbreviated to HXNBR).

Suitable copolymerizable carboxylic acids are mono- or dicarboxylic acids having from 3 to 18 C atoms which have unsaturation in the α,β-position, and their esters. Preferred α,β-unsaturated carboxylic acids are acrylic acid, methacrylic acid, itaconic acid, fumaric acid, maleic acid, crotonic acid and mixtures thereof.

Esters of the α,β-unsaturated Carboxylic acids having from 3 to 18 C atoms preferably comprise the alkyl esters and the alkoxyalkyl esters of the abovementioned carboxylic acids. Preferred esters of the α,β-unsaturated carboxylic acids having from 3 to 18 C atoms are methyl acrylate, ethyl acrylate, butyl acrylate, 2-ethylhexyl acrylate and octyl acrylate, and PEG (meth)acrylate having from 1 to 8 repeating ethylene glycol units. Preferred alkoxyalkyl esters are methoxyethyl acrylate and ethoxyethyl acrylate and mixtures of these.

Preferred esters are α,β-ethylenically unsaturated dicarboxylic monoesters, for example Alkyl esters, in particular $C_4$-$C_{18}$-alkyl esters, preferably n-butyl esters, tert-butyl esters, n-pentyl esters or n-hexyl esters, particularly preferably mono-n-butyl maleate, mono-n-butyl fumarate, mono-n-butyl citraconate, mono-n-butyl itaconate;

Alkoxyalkyl esters, in particular $C_4$-$C_{18}$-alkoxyalkyl esters, preferably $C_4$-$C_{12}$-alkoxyalkyl esters, Hydroxyalkyl esters, in particular $C_4$-$C_{18}$-hydroxyalkyl esters, preferably $C_4$-$C_{12}$-hydroxyalkyl esters, Cycloalkyl esters, in particular $C_5$-$C_{18}$-cycloalkyl esters, preferably $C_6$-$C_{12}$-cycloakyl, particularly preferably monocyclopentyl maleate, monocyclohexyl maleate, monocycloheptyl maleate, monocypentyl fumarate, monocyclohexyl fumarate, monocyclodeptyl fumarate, monocyclopentyl citraconate, monocydohexyl citraconate, monocycloheptyl citraconate, monocyclopentyl itaconate, monocyclohexyl itaconate and monocycloheptyltaconate, Alkylcycloalkyl esters, in particular $C_6$-$C_{12}$-alkylcycloalkyl esters, preferably $C_7$-$C_{10}$-alkylcycloalkyl, particularly preferably monomethylcyclopentytmaleate and monoethylcyclohexyl maleate, monomethylcyclopentyl fumarate and monoethylcyclohexyl fumarate, monomethylcyclopentyl citraconate and monoethylcyclohexyl citraconate; monomethylcyclopentyl itaconate and monoethylcyclohexyl itaconate;

Aryl esters, in particular $C_6$-$C_{14}$-aryl monoesters, preferably monoaryl maleates, monoaryl fumarates, monoaryl citraconates or monoaryl itaconates, particularly preferably monophenyl maleate or monobenzyl maleate, monophenyl fumarate or monobenzyl fumarate, monophenyl citraconate or monobenzyl citraconate, monophenyl itaconate or monobenzyl itaconate or a mixture thereof, unsaturated polycarboxylic polyalkyl esters, for example dimethyl maleate, dimethyl fumarate, dimethyl itaconates or diethyl itaconates; or α,β-ethylenically unsaturated carboxylic esters containing amino groups, for example dimethylaminomethyl acrylate or diethylaminoethyl acrylate.

The proportions of conjugated diene and of α,β-unsaturated nitrile in the HXNBR polymers can vary widely. The proportion of the, or of the entirety of the, conjugated dienes is usually in the range from 40 to 90% by weight and preferably in the range from 55 to 75% by weight, based on the entire polymer. The proportion of the, or of the entirety of the, α,β-unsaturated nitriles is usually from 9.9 to 60% by weight, preferably from 15 to 50% by weight, based on the entire polymer. Quantities present of the additional monomers are from 0.1 to 40% by weight, preferably from 1 to 30% by weight, based on the entire polymer. The proportions of all of the monomers in each case give a total of 100% by weight.

The hydrogenated carboxylated nitrile rubbers are therefore a hydrogenated carboxylated nitrile rubber HXNBR based on at least one unsaturated nitrile, on at least one conjugated diene and also on at least one termonomer comprising carboxy groups and/or comprising carboxylate groups, where at least 50% of the double bonds originally present in the XNBR have been saturated.

Examples of suitable HXNBR are hydrogenated carboxylated nitrile rubbers based on an XNBR made of butadiene and acrylonitrile and acrylic acid and/or methacrylic acid and/or fumaric acid and/or maleic acid and/or the methyl, ethyl, propyl, isopropyl, n-butyl, isobutyl, n-hexyl and/or 2-ethylhexyl hemiesters of fumaric acid and/or maleic acid and/or the methyl, ethyl, propyl, isopropyl, n-butyl, isobutyl, n-hexyl and/or 2-ethylhexyl esters of acrylic acid and/or methacrylic acid.

Hydrogenated carboxylated nitrile rubbers are accessible by various routes:

By way of example, it is possible to graft an HNBR with compounds containing carboxyl groups.

They can moreover be obtained by hydrogenation of carboxylated nitrile rubbers (XNBR). Hydrogenated carboxylated nitrile rubbers of this type are described by way of example in WO-A-01/77185.

It is also possible that other elastomers (e) are present alongside the at least one hydrogenated nitrile rubber (a). Other elastomers (e) are present in a ratio by weight of from 1:5 to 5:1 to the hydrogenated nitrile rubbers.

Component (b)—Non-Reinforcing Mineral Filler

The vulcanizable composition of the invention comprises at least one non-reinforcing mineral filler as component (b).

For the purposes of this invention the term "non-reinforcing" means a filler with specific surface area ($N_2$ surface area) smaller than 10 $m^2$/g. The values stated here in the description for the specific surface area of the non-reinforcing mineral fliers are BET values, i.e. values measured in accordance with DIN-ISO 9277.

Component (b) is a mineral filler with specific surface area ($N_2$ surface area) smaller than 10 $m^2$/g comprising at least 40% by weight silicate ($SiO_2$) and at least 10% by weight aluminium oxide ($Al_2O_3$) based on the total amount of component (b).

Component (b) is preferably calcined kaolin with specific surface area ($N_2$ surface area) smaller than 10 $m^2$/g comprising at least 40% by weight silicate ($SiO_2$) and at least 10% by weight aluminium oxide ($Al_2O_3$) based on the total amount of component (b).

An example for the preferred component (b) is SILFIT® Z 91 (commercially available at Hoffmann Mineral). SILFIT Z 91 is a naturally occurring conglomerate of amorphous and crypto-crystalline silica with lamelar kaolinite, which has been subjected to a heat treatment. SILFIT Z 91 has a surface area (BET) of 8 m/g, comprising 86% by weight $SiO_2$ ans 13% by weight $Al_2O_3$ and a pH of 6.5.

Component (b) is further preferably calcined kaolin comprising from 40 to 70% by weight of $SiO_2$ and from 30 to 60% by weight of $Al_2O_3$, with pH from 6.0 to 7.0±0.5 and with (BET) surface area from 8 to 9 $m^2$/g.

Component (b) is particularly preferably calcined kaolin comprising from 50 to 60% by weight of $SiO_2$ and from 35 to 45% by weight of $Al_2O_3$, with pH from 6.4 to 6.6±0.5 and with (BET) surface area from 8.3 to 8.7 $m^2$/g.

Component (b) is very particularly preferably calcined kaolin comprising 50 to 60% by weight, preferably 55% by weight of $SiO_2$, 35 to 45% by weight, preferably 41% by weight of $Al_2O_3$ with pH 6.5±0.5 and with (BET) surface area 8.5 $m^2$/g. An example of a very particularly preferred component (b) is the calcined kaolin Polestar® 200R (obtainable commercially from Imerys). Polestar® 200R is produced by heating of comminuted kaolin to temperatures above 1000° C.

The quantity present of component (b) in the vulcanizable compositions of the invention is preferably from 50 to 100 parts by weight, particularly preferably from 60 to 90 parts by weight, based on 100 parts of the hydrogenated nitrite rubbers (a).

Component (c)—Basic Sodium Silicate

The vulcanizable composition of the invention comprises at least one basic sodium silicate (c).

For the purposes of this invention the term "basic sodium silicate" means sodium comprising silicates which have a pH above 7 measured in 5% by weight aqueous solution in accordance with DIN ISO 787/9.

Component (c) is a basic sodium silicate with pH above 7, preferably with pH above 8, particularly preferably with pH from above 8 to 12, and very particularly preferably with pH from 10.5 to 12, measured in 5% aqueous solution in accordance with DIN ISO 787/9. An example of basic silicates with pH above 7 is sodium aluminium silicate obtainable with trademark Vulkasil® A1 from LANXESS.

Component (c) is preferably a basic sodium silicate with pH above 8 from the group consisting of sodium aluminium silicate and sodium orthosilicate ($Na_4SiO_4$), sodium metasilicate ($Na_2SiO_3$), disodium disilicate ($Na_2Si_2O_5$), sodium trisilicate ($Na_2Si_3O_7$) particularly preferably sodium aluminium silicate.

Component (c) is particularly preferably a sodium aluminium silicate.

An example for a particularly preferred component (c) is sodium aluminium silicate with trademark Zeolex® 23 (commercially available at Huber) with a pH of 10 and a specific surface area (BET) of 80.

Component (c) is very particularly preferably sodium aluminium silicate with pH in water (5% by weight in water) measured in accordance with DIN ISO 787/9 of 11.3±0.7, with content of volatile constituents measured in accordance with DIN ISO 787/2 of 5.5±1.5 and with (BET) surface area measured in accordance with ISO 9277 of 65±15. An example of a very particularly preferred component (c) is the sodium aluminium silicate with trademark Vulkasil® A1 (obtainable commercially from LANXESS).

The quantity of component (c) present in the vulcanizable compositions of the invention is preferably from 5 to 50 parts by weight particularly preferably from 10 to 30 parts by weight, based on 100 parts by weight of the hydrogenated nitrite rubbers (a).

The ratio by weight of component (b) to component (c) is from 20:1 to 1:1, preferably from 10:1 to 2:1, particularly preferably from 5:1 to 3:1.

Component (d)—Peroxide Compound

At least one peroxide compound is used as crosslinking agent as component (d).

The following peroxide compounds are by way of example suitable as peroxide compound (d):

Bis-(2,4-dichlorobenzoyl) peroxide, dibenzoyl peroxide, bis(4-chlorobenzoyl) peroxide, 1,1-bis(tert-butylperoxy)-3,3,5-trimethylcyclohexene, tert-butyl perbenzoate, 2,2-bis(tert-butylperoxy)butene, 4,4-di-tert-butylperoxynonyl valerate, dicumyl peroxide, 2,5-dimethyl-2,5-di(tert-butylperoxy)hexane, tert-butyl cumyl peroxide, 1,3-bis(tert-butylperoxyisopropyl)benzene, di-tert-butyl peroxide, 2,5-dimethyl-2,5-di(tert-butylperoxy)hexyne, tert-butyl hydroperoxide, hydrogen peroxide, methyl ethyl ketone peroxide, lauroyl peroxide, decanoyl peroxide, 3,5,5-trimethylhexanoyl peroxide, di(2-ethylhexyl) peroxydicarbonate, poly(tert-butyl peroxycarbonate), ethyl 3,3-di(tert-butylperoxy)butyrate, ethyl 3,3-di(ter-amylperoxy)butyrate, n-butyl 4,4-di(tert-butylperoxy)valerate, 2,2-d(tert-butylperoxy)butane, 1,1-di(tert-butylperoxy)cyclohexane, 3,3,5-trimethylcyclohexane, 1,1-d(tert-amylperoxy)cyclohexane, tert-butyl peroxybenzoate, tert-butyl peroxyacetate, tert-butyl peroxy-3,5,5-trimethylhexanoate, tert-butyl peroxyisobutyrate, tert-butyl peroxy-2-ethylhexanoate, tert-butyl peroxypivalate, tert-amyl peroxypivalate, tert-butyl peroxyneodecanoate, cumyl peroxyneodecanoate, 3-hydroxy-1,1-dimethylbutyl peroxyneodecanoate, tert-butyl peroxybenzoate, tert-butyl peroxyacetate, tert-amyl peroxy-3,5,5-trimethylhexanoate, tert-butyl peroxyisobutyrate, tert-butyl peroxy-2-ethylhexanoate, cumyl peroxyneodecanoste, 3-hydroxy-1,1-dimethylbutyl peroxyneodecanoate, 2,5-dimethyl-2,5-di(tert-butylperoxy)hexyne (3-di-tert-amyl) peroxide, 2,5-dimethyl-2,5-di(tert-butylperoxy)hexane, tert-amyl hydroperoxide, cumene hydroperoxide, 2,5-dimethyl-2,5-di(hydroperoxy)hexane, diisopropylbenzene monohydroperoxide and potassium peroxodisulphate.

The at least one peroxide compound of the vulcanizable composition of the invention is preferably an organic peroxide, in particular dicumyl peroxide, tert-butyl cumyl peroxide, bis(tert-butylperoxyisopropyl)benzene, di-tert-butyl peroxide, 2,5-dimethylhexane 2,5-dihydroperoxide, 2,5-dimethylhex-3-yne 2,5-dihydroperoxide, dibenzoyl peroxide, bis(2,4-dichlorobenzoyl) peroxide, tert-butyl perbenzoate, butyl 4,4-di(tert-butylperoxy)valerate and/or 1,1-bis(tert-butylperoxy)-3,3,5-trimethylcyclohexane.

The quantity of component (d) present in the vulcanizable compositions of the invention is preferably from 1 to 20 parts by weight, particularly preferably from 2 to 10 parts by weight, based on 100 parts by weight of the hydrogenated nitrile rubbers (a).

The vulcanizable composition can moreover comprise other rubber additives. Conventional rubber additives include by way of example: polymers not covered by the inventive definition of component (a), filer activators, oils, in particular processing oils or extender oils, plasticizers, processing aids, accelerators, polyfunctional crosslinking agents, ageing retarders, antiozonants, oxidation inhibitors, mould release agents, scorch inhibitors, other stabilizers and antioxidants, dyes, fibres comprising organic and inorganic fibres, and also fibre pulps, vulcanization activators, and additional polymerizable monomers, dimers, trimers or oligomers.

Filler activators that can be used are in particular organic silanes, for example vinylrimethyloxysilane, vinyldimethoxymelhylsane, vinyltriethoxysilane, vinyltris(2-methoxy-ethoxy)silane, N-cyclohexyl-3-aminopropyltrimethoxysilane, 3-aminopropyltrimethoxysilane, methyltrimethoxysilane, methyltriethoxysilane, dimethyldimethoxysilane, dimethyldiethoxysilane, trimethylethoxysilane, isooctyltrimethoxysilane, isooctyltriethoxysilane, hexadecylrimethoxysilane or (octadecyl)methyldimethoxysilane. Other filler activators are by way of example surface-active substances such as triethanolamine or ethylene glycols with molecular weights from 74 to 10 000 g/mol. The quantity of filler activators is usually from 0.5 to 10 parts by weight, based on 100 parts by weight of the hydrogenated nitrile rubbers (a).

Ageing inhibitors that can be used are in particular those which scavenge the lowest possible number of free radicals during peroxide vulcanization. These are in particular oligomerized 2,2,4-trimethyl-1,2-dihydroquinoline (TMQ), styrinated diphenylamine (DDA), octylated diphenylamine (OCD) or zinc sail of 4- and 5-methylmercaptobenzimidazole (ZMB2). Other compounds that can be used alongside these are the known phenolic ageing inhibitors, such as sterically hindered phenols or ageing inhibitors based on phenylene diamine. Combinations of the ageing inhibitors mentioned can also be used.

Quantities usually used of the ageing inhibitors are from 0.1 to 5 parts by weight, preferably from 0.3 to 3 parts by weight, based on 100 parts by weight of the hydrogenated nitrile rubbers (a).

Examples of mould-release agents that can be used are: saturated or to some extent unsaturated fatty and oleic acids or their derivates (in the form of fatty acid esters, fatty acid salts, fatty alcohols or fatty acid amides) and also products that can be applied to the mould surface, for example products based on low-molecular-weight silicone compounds, products based on fluoropolymers and also products based on phenolic resins.

Quantities of the mould-release agents used as mixture constituent are from 0.2 to 10 parts by weight, preferably from 0.5 to 5 parts by weight, based on 100 parts by weight of the hydrogenated nitrile rubbers (a).

It can be desirable to use an antioxidant in the compositions of the invention. Examples of usual antioxidants include p-dicumydiphenylamine (Naugard® 445), Vulkanox® DDA (styrinated diphenylamine). Vulkanox® ZMB2 (zinc salt of methylmercaptobenzimidazole), Vulkanox® HS (polymerized 1,2-dihydro-2,2,4-trimethylquinoline) and Irganox® 1035 (thiodiethylene bis(3,5-di-tert-butyl-4-hydroxy)hydrocinnamate or thiodiethylene bis(3-(3,5-di-tert-butyl-4-hydroxyphenyl)propionate).

Other possibilities are reinforcement of the vulcanizates with reinforcement systems made of glass according to the teaching of U.S. Pat. No. 4,826,721, and also reinforcement with aromatic polyamides (Aramid®).

In a preferred embodiment the vulcanizable composition of the invention comprises
- a) 100 parts by weight of at least one hydrogenated nitrile rubber,
- b) 50 to 100 parts by weight, preferably from 60 to 90 parts by weight, of at least one mineral filler with specific surface area ($N_2$ surface area) smaller than 10 $m^2/g$ comprising at least 40% by weight silicate ($SiO_2$) and at least 10% by weight aluminium oxide ($Al_2O_3$) based on the total amount of component (b),
- c) 5 to 50 parts by weight, preferably from 10 to 30 parts by weight of at least one basic sodium silicate,
- d) from 1 to 20 parts by weight, preferably from 2 to 10 parts by weight, of at least one peroxide compound, preferably dicumyl peroxide, tert-butyl cumyl peroxide, bis-(tert-butyl-peroxy-isopropyl)benzene, di-tert-butyl peroxide, 2,5-dimethylhexane 2,5-dihydroperoxide, 2,5-dimethylhex-3-yne 2,5-dihydroperoxide or dibenzoyl peroxide,
- e) from 0 to 200 parts by weight, preferably from 0 to 100 parts by weight, of at least one conventional rubber additive.

In a particularly preferred embodiment the vulcanizable composition of the invention comprises
- (a) 100 parts by weight of at least one hydrogenated nitrile rubber,
- (b) from 60 to 90 parts by weight of at least one calcined kaolin comprising 50 to 60% by weight, preferably 55% by weight of $SiO_2$ and 35 to 45% by weight, preferably 41% by weight of $Al_2O_3$ based on the total amount of component (b) with pH in water (5% by weight in water) measured in accordance with DIN ISO 787/9 of 6.5±0.5 and with (BET) surface area measured in accordance with ISO 9277 of 8.5 $m^2/g$,
- (c) from 10 to 30 parts by weight of at least one sodium aluminium silicate with pH in water (5% by weight in water) measured in accordance with DIN ISO 787/9 of 11.3±0.7, with content of volatile constituents measured in accordance with DIN ISO 787/2 of 5.5±1.5 and with (BET) surface area measured in accordance with ISO 9277 of 65±15,
- (d) from 2 to 10 parts by weight of at least one peroxide compound, preferably dicumyl peroxide, tert-butyl cumyl peroxide, bis(tert-butylperoxyisopropyl)benzene, di-tert-butyl peroxide, 2,5-dimethylhexane 2,5-dihydroperoxide, 2,5-dimethylhex-3-yne 2,5-dihydroperoxide or dibenzoyl peroxide,
- (e) from 0 to 100 parts by weight of at least one conventional rubber additive.

The invention moreover provides a process for the production of the abovementioned vulcanizable compositions of the invention in that all of the components (a), (b), (c) and (d) are mixed. This can take place with use of devices and mixing apparatuses known to the person skilled in the art.

The sequence in which the components are mixed with one another is not of fundamental importance, but instead is selected in each case to be appropriate for the mixing assemblies that are available.

Mixing of components (a), (b), (c) and (d) here can take place in the typical mixing systems familiar in the rubber industry, as required by the temperature. It is possible to use i) mixing assemblies that operate batchwise in the form of mixing rolls or internal mixers, and also ii) mixing assemblies that operate continuously, for example mixing extruders.

In a method that has proved particularly successful, mixing of components (a), (b), (c) and (d) is carried out at a prescribed mixer temperature in the range of about 30° C. to 40° C., since it is possible here with the abovementioned mixing assemblies familiar in the rubber-processing industry to apply sheer forces that are sufficiently high to achieve good mixing.

Alternatively, mixing can also be carried out in suitable assemblies at higher temperatures. It can be necessary in particular cases to begin by mixing components (a), (b) and (c) and to avoid admixing the peroxide compound (d) until the very end of the procedure. This admixing can by way of example take place in the mixing assembly in the end section of a nozzle immediately before discharge of the mixture onto the substrate/into the mould.

After the mixing of the components of the invention, the vulcanizable compositions are in practice obtained by way of example in the form of what are known as "skins", feed strips or feed slabs, or else in the form of pellets or granulates. These can then be compressed in moulds or injection-moulded, and are crosslinked under suitable conditions appropriate for the peroxide compounds used.

The invention moreover provides a process for the production of vulcanizates, in that the vulcanizable composition of the invention of the above type is subjected to vulcanization, i.e. introduction of energy, in particular heat treatment.

The energy can be introduced in the form of heat or of radiative energy, as required by the type of peroxide compound (d) selected in the vulcanizable composition.

Production of the vulcanized products by means of heat treatment is carried out in that the vulcanizable compositions of the invention are exposed in conventional manner to a temperature which is preferably in the range from 120° C. to 200° C., particularly preferably from 140° C. to 180° C., in suitable moulds.

During the crosslinking of the vulcanizable composition of the invention the peroxide compound (d) leads to free-radical crosslinking between and with the hydrogenated nitrile rubber (a) used.

The invention moreover also provides vulcanizates obtained by crosslinking, i.e. vulcanization, of the vulcanizable compositions of the invention.

The invention moreover provides the use of the vulcanizates as gaskets, belts, roll coverings, hoses and cables.

EXAMPLES

Production, Vulcanization and Characterization of the Rubber Compositions

The primary mixing assembly used was a mixing-roll system with rolls cooled to 30° C. from Troester (WNU3), with rolls of diameter 200 mm. The hydrogenated nitrile rubber (a) was charged to this system, and all of the other components were added in the sequence (b) then (c) then (d) (see list of components below). The rotation rate and friction ratio of the rolls here was controlled to give stable skins. After about 5 min of mixing time, mixing was terminated and the product was drawn off in the form of skin from the roll. This skin was then vulcanized for 15 min at 180° C. in platen presses.

Components Used:

| | |
|---|---|
| Therban ® LT2007 | Acrylate-containing hydrogenated nitrile rubber, ACN content: 21 ± 1.5% by weight, Mooney viscosity ML 1 + 4 @100° C.: 74 ± 10 MU, residual double bond content: ≤0.9%. This hydrogenated nitrile rubber is obtainable commercially from LANXESS Deutschland GmbH. |
| Therban ® 3607 | Hydrogenated nitrile rubber, ACN content: 36 ± 1.5% by weight, Mooney viscosity ML 1 + 4 @100° C.: 66 ± 7 MU, residual double bond content: ≤0.9%. This hydrogenated nitrile rubber is obtainable commercially from LANXESS Deutschland GmbH. |
| Polestar ® 200R | Calcined kaolin from imerys, comprising 55% by weight of $SiO_2$, 41% by weight of $Al_2O_3$ with pH 6.5 ± 0.5 and with (BET) surface area 8.5 $m^2/g$. |
| Vulkasil ® A1 | Sodium aluminium silicate from LANXESS with pH in water (5% by weight in water) measured in accordance with DIN ISO 787/9 of 11.3 ± 0.7, with content of volatile constituents measured in accordance with DIN ISO 787/2 of 5.5 ± 1.5 and with (BET) surface area measured in accordance with ISO 9277 of 65 ± 15. |
| Perkadox ® 14-40 | Di(tert-butylperoxyisopropyl)benzene, 40% supported on silica, available commercially from Akzo Nobel Polymer Chemicals BV. |
| N990 | Carbon black from Orion Engineered Carbon. |
| Uniplex ® 546 | Trioctyl trimellitate (TOTM), available commercially from LANXESS Deutschland GmbH. |
| Maglite ® | Magnesium oxide, available commercially from CP Hall. |
| Luvomaxx ® CDPA | 4,4'-Bis-(1,1-dimethylbenzyl)-diphenylamine, obtainable from Lehmann and Voss. |
| Vulkanox ® ZMB2/C5 | Zinc salt of 4- and 5-methyl-2-mercaptobenzothiazole, available commercially from LANXESS Deutschland GmbH. |
| Silquest ® RC1 | Organosilane, available commercially from Momentive Performance Materials. |
| TAIC | Triallyl isocyanurate, 70% masterbatch, available commercially from Kettlitz Chemie GmbH & Co KG. |
| Active zinc oxide | Zinc oxide, available commercially from LANXESS Deutschland GmbH. |
| TRIM | Trimethylolpropane trimethacrylate, 70% masterbatch available commercially from Kettlitz Chemie GmbH & Co KG. |

All "phr" quantities stated in the tables mean parts per hundred parts of rubber. The entirety of all of the elastomer components, comprising at least one hydrogenated nitrile rubber, corresponds to 100 phr.

Crosslinking density was determined with a Moving Die Rheometer (MDR 2000E), using an angle of 0.5° and an oscillation frequency of 1.7 Hz at 180° C. for 30 minutes.

For the tensile test, 2 mm sheets were produced by vulcanization of the vulcanizable mixture at 180° C. The dumbbell-shaped test samples were punched out from the said sheets, and tensile strength and elongation were determined in accordance with ASTM D2240-81.

Hardness was determined with a durometer in accordance with ASTM D2240-81.

Compression set was determined in accordance with DIN ISO 850 Part A.

Ageing behaviour of the vulcanizate was determined in accordance with DIN 53508.

Examples 1-4

All of the examples of the invention are characterized in the following Tables 1 to 4 with an * after the respective example number.

TABLE 1

| | Valcanizable compositions | | | |
|---|---|---|---|---|
| | 1 | 2* | 3 | 4* |
| (a) Therban ® LT2007 | 100 | 100 | | |
| (a) Therban ® 3607 | | | 100 | 100 |
| (b) Polestar ® 200R | | 80 | | 80 |
| (c) Vulkasil ® A1 | | 20 | | 20 |
| (d) Perkadox ® 14-40 | 10 | 10 | 10 | 8 |
| N990 | 100 | | 100 | |

TABLE 1-continued

| | Valcanizable compositions | | | |
|---|---|---|---|---|
| | 1 | 2* | 3 | 4* |
| TOTM | 10 | 10 | | 10 |
| MgO | 2 | 2 | | 2 |
| CDPA | 1.4 | 1.4 | 1.4 | 1.4 |
| Vulkanox ® ZMB2 | 0.4 | 0.4 | 0.4 | 0.4 |

TABLE 1-continued

Valcanizable compositions

|  | 1 | 2* | 3 | 4* |
|---|---|---|---|---|
| Silquest ® RC1 |  | 2 |  | 2 |
| TAIC 70% | 3 | 3 |  |  |
| ZnO |  |  | 3 | 5 |
| TRIM |  |  | 3 | 4 |

The compositions 2* and 4* of the invention also comprise, alongside a hydrogenated nitrile rubber (component (a)) and a peroxide compound (component (d)), both a mineral filler with specific surface area ($N_2$ surface area) smaller than 10 m²/g comprising at least 40% by weight silicate ($SiO_2$) and at least 10% by weight aluminium oxide ($Al_2O_3$) (component (b)) and also a basic sodium silicate (component (c)).

TABLE 2

Vulkanization test

|  |  | 1 | 2* | 3 | 4* |
|---|---|---|---|---|---|
| Delta S' | dNm | 21.71 | 22.18 | 37.7 | 25.16 |
| M 10 | MPa | 0.6 | 0.7 | 1 | 0.9 |
| M 25 | MPa | 1.2 | 1.6 | 2 | 1.8 |
| M 50 | MPa | 2.6 | 4.2 | 4.2 | 4 |
| M 100 | MPa | 7.3 | 11.5 | 10.1 | 10.1 |
| EB | % | 181 | 135 | 210 | 166 |
| TS | MPa | 13 | 15 | 16 | 16.8 |
| H | ShA | 67 | 70 | 77 | 74.1 |

The composition 2* of the invention, comprising a fully hydrogenated acrylate-containing nitrile rubber, has lower elongation at break than compositions which comprise only carbon black as reinforcing filler (see comparative example 5).

The composition 4* of the invention, comprising a fully hydrogenated nitrile rubber, has lower elongation at break than compositions which comprise only carbon black as reinforcing filler (see comparative example 6).

TABLE 3

Properties of the vulcanized rubber compositions

| High-temperature compression set value |  | 1 | 2* | 3 | 4* |
|---|---|---|---|---|---|
| 175° C./168 h | % | 41 | 39 | 55 | 41 |

The rubber compositions 2* and 4* of the invention have a lower high-temperature compression set value for 175'C/168 hours than the comparative vulcanizates 1 and 3 without components (b) and (c). Both of the rubber compositions 2* and 4* of the invention have a high-temperature compression set value below 45%.

Ageing behaviour was then characterized by ageing all of the vulcanizates in accordance with DIN 53508 for 7 days (168 hours) at 175° C.

The values stated in Table 4 were then determined at a test temperature of 23° C.

TABLE 4

Properties of the vulcanized rubber compositions after ageing at 175° C. for 168 hours

| Hot-air ageing 175° C./168 h |  | 1 | 2* | 3 | 4* |
|---|---|---|---|---|---|
| M 10 | MPa | 1 | 1 | 3 | 2 |
| M 25 | MPa | 3 | 3 | 6 | 4 |
| M 50 | MPa | 6 | 7 | 11 | 8 |
| M 100 | MPa | 12 | 14 | 18 | 14 |
| EB | % | 109 | 107 | 103 | 135 |
| TS | MPa | 12 | 14 | 18 | 16 |
| H | ShA | 77 | 78 | 88 | 82 |
| ΔEB | % | −40 | −21 | −51 | −19 |
| ΔTS | % | −5 | −7 | 16 | −5 |
| ΔH | ShA | 10 | 8 | 11 | 8 |

The series of experiments shows that the vulcanizates produced according to the invention, i.e. the vulcanized rubber compositions 2* and 4*, are significantly superior to the comparative vulcanizates 1 and 3 in respect of high-pressure compression set and in relation to ageing properties after long-period hot-air ageing (in particular in respect of elongation at break ΔEB and hardness ΔH).

The invention claimed is:
1. A vulcanizable composition comprising:
   (a) at least one hydrogenated nitrile rubber,
   (b) least one mineral filler which comprises calcined kaolin with specific surface area ($N_2$ surface area) smaller than 10 m²/g comprising at least 40% by weight silicate ($SiO_2$) and at least 10% by weight aluminium oxide ($Al_2O_3$) based on the total amount of component (b),
   (c) at least one basic sodium silicate, and
   (d) at least one peroxide compound.
2. The vulcanizable composition according to claim 1, wherein the at least one hydrogenated nitrile rubber (a) has a residual double bonds (RDB) content of 10% or less.
3. The vulcanizable composition according to claim 1, wherein the at least one hydrogenated nitrile rubber (a) comprises repeating units of: at least one unsaturated nitrile, at least one conjugated diene, and one or more other copolymerizable monomers in the form of carboxylic acids or carboxylic esters.
4. The vulcanizable composition according to claim 1, wherein the composition comprises 50 to 100 parts by weight of the at least one mineral filler (b), based on 100 parts by weight of the at least one hydrogenated nitrile rubber (a).
5. The vulcanizable composition according to claim 1, wherein the composition comprises 5 to 50 parts by weight of the at least one basic sodium silicate (c), based on 100 parts by weight of the hydrogenated nitrile rubber (a).
6. The vulcanizable composition according to claim 1, wherein the at least one basic sodium silicate (c) comprises sodium orthosilicate ($Na_4SiO_4$), sodium metasilicate ($Na_2SiO_3$), disodium disilicate ($Na_2Si_2O_5$), or sodium trisilicate ($Na_2Si_3O_7$).
7. The vulcanizable composition according to claim 1, wherein the at least one basic sodium silicate (c) comprises sodium aluminium silicate with a pH in water (5% by weight in water) measured in accordance with DIN ISO 787/9 of 11.3±0.7, with a content of volatile constituents measured in accordance with DIN ISO 787/2 of 5.5±1.5 and with a (BET) surface area measured in accordance with ISO 9277 of 65±15.

8. The vulcanizable composition according to claim 1, wherein the composition comprises a ratio by weight of component (b) to component (c) of 20:1 to 1:1.

9. The vulcanizable composition according to claim 1, wherein the composition comprises 1 to 20 parts by weight of the at least one peroxide compound (d), based on 100 parts by weight of the at least one hydrogenated nitrile rubber (a).

10. The vulcanizable composition according to claim 1, wherein the at least one peroxide compound (d) comprises dicumyl peroxide, tert-butyl cumyl peroxide, bis(tert-butylperoxyisopropyl)benzene, di-tert-butyl peroxide, 2,5-dimethylhexane 2,5-dihydroperoxide, 2,5-dimethylhex-3-yne 2,5-dihydroperoxide, dibenzoyl peroxide, bis(2,4-dichlorobenzoyl)peroxide, tert-butyl perbenzoate, butyl 4,4-di(tert-butylperoxy)valerate, or 1,1-bis(tert-butylperoxy)-3,3,5-trimethylcyclohexane.

11. The vulcanizable composition according to claim 1, wherein the composition comprises:
(a) 100 parts by weight of the at least one hydrogenated nitrile rubber,
(b) 50 to 100 parts by weight of the at least one mineral filler,
(c) 5 to 50 parts by weight of the at least one basic sodium silicate, and the at least one basic sodium silicate has a pH in water (5% by weight in water) measured in accordance with DIN ISO 787/9 greater than 7, and
(d) 1 to 20 parts by weight of the at least one peroxide compound.

12. The vulcanizable composition according to claim 1, wherein the composition comprises:
(a) 100 parts by weight of the at least one hydrogenated nitrile rubber,
(b) 50 to 100 parts by weight of calcined kaolin comprising 50 to 60% by weight of $SiO_2$ and 35 to 45% by weight of $Al_2O_3$ with pH in water (5% by weight in water) measured in accordance with DIN ISO 787/9 of 6.5±0.5 and with (BET) surface area measured in accordance with ISO 9277 of 8.5 $m^2/g$,
(c) 5 to 50 parts by weight of sodium aluminium silicate with pH in water (5% by weight in water) measured in accordance with DIN ISO 787/9 of 11.3±0.7, with content of volatile constituents measured in accordance with DIN ISO 787/2 of 5.5±1.5 and with (BET) surface area measured in accordance with ISO 9277 of 65±15, and
(d) 1 to 20 parts by weight of at least one the peroxide compound.

13. The vulcanization composition according to claim 1, wherein the at least one peroxide compound is selected from the group consisting of dicumyl peroxide, tert-butylcumyl peroxide, bis(tert-butylperoxyisopropyl)benzene, di-tert-butyl peroxide, 2,5-dimethylhexane 2,5-dihydroperoxide, 2,5-dimethylhex-3-yne 2,5-dihydroperoxide or dibenzoylperoxide.

14. The vulcanizable composition according to claim 11, wherein the at least one hydrogenated nitrile rubber (a) has a residual double bonds (RDB) content of 10% or less, and comprises repeating units of: at least one unsaturated nitrile, at least one conjugated diene, and one or more other copolymerizable monomers in the form of carboxylic acids or carboxylic esters.

15. The vulcanizable composition according to claim 14, wherein the composition comprises:

60 to 90 parts by weight of component (b), based on 100 parts by weight of the hydrogenated nitrile rubber (a);
10 to 30 parts by weight of the at least one basic sodium silicate (c), based on 100 parts by weight of the at least one hydrogenated nitrile rubber (a); and
2 to 10 parts by weight of the at least one peroxide compound (d), based on 100 parts by weight of the at least one hydrogenated nitrile rubber (a).

16. The vulcanizable composition according to claim 15, wherein:
the residual double bonds (RDB) content is 7% or less;
the one or more other copolymerizable monomers are selected from the group consisting of acrylic acid, methacrylic acid, itaconic acid, fumaric acid, maleic acid, crotonic acid, methylacrylate, ethyl acrylate, butyl acrylate, 2-ethylhexyl acrylate, octylacrylate, PEG (meth)acrylate having from 1 to 8 repeating ethylene glycol units, methoxyethyl acrylate or ethoxyethylacrylate, or a mixture of these;
the composition comprises a ratio by weight of component (b) to component (c) of 10:1 to 2:1;
the at least one mineral filler (b) comprises calcined kaolin;
at least one the basic sodium silicate (c) comprises sodium orthosilicate ($Na_4SiO_4$), sodium metasilicate ($Na_2SiO_3$), disodium disilicate ($Na_2Si_2O_5$), or sodium trisilicate ($Na_2Si_3O_7$); and
the at least one peroxide compound (d) comprises dicumyl peroxide, tert-butyl cumyl peroxide, bis(tert-butylperoxyisopropyl)benzene, di-tert-butylperoxide, 2,5-dimethylhexane 2,5-dihydroperoxide, 2,5-dimethylhex-3-yne 2,5-dihydroperoxide, dibenzoyl peroxide, bis(2,4-dichlorobenzoyl)peroxide, tert-butyl perbenzoate, butyl 4,4-di(tert-butylperoxy)valerate, or 1,1-bis(tert-butylperoxy)-3,3,5-trimethylcyclohexane.

17. The vulcanizable composition according to claim 16, wherein:
the residual double bonds (RDB) content is 1% or less;
the calcined kaolin comprises 55% by weight of $SiO_2$ and 41% by weight of $Al_2O_3$ with pH in water (5% by weight in water) measured in accordance with DIN ISO 787/9 of 6.5±0.5 and with (BET) surface area measured in accordance with ISO 9277 of 8.5 $m^2/g$;
the basic sodium silicate comprises sodium aluminium silicate with pH in water (5% by weight in water) measured in accordance with DIN ISO 787/9 of 11.3±0.7, with content of volatile constituents measured in accordance with DIN ISO 787/2 of 5.5±1.5 and with (BET) surface area measured in accordance with ISO 9277 of 65±15;
the at least one peroxide compound is selected from the group consisting of dicumyl peroxide, tert-butylcumyl peroxide, bis(tert-butylperoxyisopropyl)benzene, di-tert-butyl peroxide, 2,5-dimethylhexane 2,5-dihydroperoxide, 2,5-dimethylhex-3-yne 2,5-dihydroperoxide or dibenzoyl peroxide; and
the composition comprises a ratio by weight of component (b) to component (c) of 5:1 to 3:1.

18. A vulcanizate produced by vulcanization of the vulcanizable composition according to claim 1.

19. The vulcanizate according to claim 18 wherein the vulcanizate comprises gaskets, belts, roll coverings, hoses or cables.

* * * * *